US010112365B2

(12) United States Patent
Van Der Zijpp et al.

(10) Patent No.: US 10,112,365 B2
(45) Date of Patent: Oct. 30, 2018

(54) METHOD FOR PROVIDING A CARRIER MATERIAL

(71) Applicant: LOW & BONAR B.V., Arnhem (NL)

(72) Inventors: Ype Van Der Zijpp, Wijhe (NL); Marc Berkhoff, Ede (NL)

(73) Assignee: LOW & BONAR B.V., Arnhem (NL)

( * ) Notice: Subject to any disclaimer, the term of this patent is extended or adjusted under 35 U.S.C. 154(b) by 0 days.

(21) Appl. No.: 15/028,797

(22) PCT Filed: Oct. 14, 2014

(86) PCT No.: PCT/EP2014/071966
§ 371 (c)(1),
(2) Date: Apr. 12, 2016

(87) PCT Pub. No.: WO2015/055619
PCT Pub. Date: Apr. 23, 2015

(65) Prior Publication Data
US 2016/0250821 A1  Sep. 1, 2016

(30) Foreign Application Priority Data

Oct. 18, 2013 (EP) ..................... 13189205

(51) Int. Cl.
| B32B 5/08 | (2006.01) |
| B32B 5/26 | (2006.01) |
| B32B 37/24 | (2006.01) |
| E04D 5/02 | (2006.01) |
| E04D 5/10 | (2006.01) |
| D04H 1/559 | (2012.01) |
| D04H 5/06 | (2006.01) |
| B32B 5/02 | (2006.01) |
| D06N 5/00 | (2006.01) |
| D04H 3/04 | (2012.01) |
| B32B 7/12 | (2006.01) |
| B32B 37/06 | (2006.01) |

(52) U.S. Cl.
CPC .............. *B32B 5/022* (2013.01); *B32B 5/028* (2013.01); *B32B 5/08* (2013.01); *B32B 5/26* (2013.01); *B32B 7/12* (2013.01); *B32B 37/06* (2013.01); *B32B 37/24* (2013.01); *D04H 1/559* (2013.01); *D04H 3/04* (2013.01); *D04H 5/06* (2013.01); *D06N 5/003* (2013.01); *E04D 5/02* (2013.01); *E04D 5/10* (2013.01); *B32B 2260/023* (2013.01); *B32B 2260/042* (2013.01); *B32B 2260/046* (2013.01); *B32B 2262/0261* (2013.01); *B32B 2262/0276* (2013.01); *B32B 2262/0284* (2013.01); *B32B 2262/101* (2013.01); *B32B 2262/12* (2013.01); *B32B 2262/14* (2013.01); *B32B 2305/38* (2013.01); *B32B 2307/54* (2013.01); *B32B 2307/5825* (2013.01); *B32B 2419/06* (2013.01); *B32B 2471/00* (2013.01); *Y10T 442/159* (2015.04)

(58) Field of Classification Search
CPC ......... B32B 5/022; B32B 5/024; B32B 5/028; B32B 5/08; B32B 5/12; B32B 5/26; B32B 37/24; B32B 2260/021; B32B 2260/023; B32B 2260/042; B32B 2262/0261; B32B 2262/0276; B32B 2262/0284; B32B 2262/101; B32B 2262/12; B32B 2262/14; B32B 2305/28; B32B 2305/38; B32B 2307/54; B32B 2419/06; B32B 2471/00; D06N 5/00; D06N 5/003; E04D 5/00; E04D 5/02; E04D 5/10; D04H 1/4218; D04H 1/435; D04H 1/54; D04H 1/541; D04H 1/542; D04H 1/549; D04H 1/55; D04H 1/559; D04H 1/58; D04H 1/587; D04H 3/14; D04H 3/147; D04H 3/153; D04H 5/06; D04H 5/12; Y10T 442/159

See application file for complete search history.

(56) References Cited

U.S. PATENT DOCUMENTS

| 4,539,254 A * | 9/1985 | O'Connor ................ B32B 5/08 156/282 |
| 4,574,107 A | 3/1986 | Ferrari |
| 4,749,609 A * | 6/1988 | Lempereur ............... B32B 5/28 428/105 |
| 5,118,550 A * | 6/1992 | Baravian ................... D04H 5/02 428/489 |
| 5,192,601 A | 3/1993 | Neisler |
| 5,508,093 A * | 4/1996 | Mehdorn ............. D04H 1/4218 428/219 |
| 6,585,842 B1 * | 7/2003 | Bompard .............. B29C 70/202 156/166 |
| 2002/0192467 A1 * | 12/2002 | Secrist .................. B29C 70/226 428/365 |
| 2003/0215633 A1 * | 11/2003 | Morris ..................... C08K 7/14 428/375 |
| 2004/0219855 A1 * | 11/2004 | Tsotsis ................... B29B 11/16 442/364 |
| 2008/0166517 A1 * | 7/2008 | Horne ...................... B32B 5/26 428/113 |
| 2010/0003881 A1 * | 1/2010 | Tsotsis .................... B29C 70/20 442/327 |
| 2011/0275268 A1 | 11/2011 | Harris et al. |

FOREIGN PATENT DOCUMENTS

| EP | 0 239 207 A2 | 9/1987 |
| EP | 2 075 360 A1 | 7/2009 |

(Continued)

OTHER PUBLICATIONS

Nov. 19, 2014 International Search Report and Written Opinion issued in International Patent Application No. PCT/EP2014/071966.

(Continued)

Primary Examiner — Michael A Tolin
(74) Attorney, Agent, or Firm — Oliff PLC

(57) ABSTRACT

A method to manufacture a carrier material including a nonwoven layer of fibers and threads extending in the longitudinal direction of the carrier material includes the steps of supplying a nonwoven layer of fibers, supplying a scrim comprising weft threads including a polymer having a melting temperature equal to or less than the lowest melting temperature of the thermoplastic fibers of the nonwoven layer of fibers, and thermally bonding the scrim to the nonwoven layer of fibers.

16 Claims, No Drawings

(56) References Cited

FOREIGN PATENT DOCUMENTS

WO        98/05491 A1    2/1998
WO        02/070246 A1    9/2002

OTHER PUBLICATIONS

Sep. 30, 2015 International Preliminary Report on Patentability issued in International Patent Application No. PCT/EP2014/071966.

* cited by examiner

METHOD FOR PROVIDING A CARRIER MATERIAL

BACKGROUND

Described herein is a method for providing a carrier material comprising a nonwoven layer of fibers and threads extending in longitudinal direction of the carrier material.

Carrier materials comprising a nonwoven layer fibers are being used in many applications such as for example bitumen roofing membranes, roofing underlayment sheets and (cushion) vinyl floor coverings.

Elevated temperatures and/or high tensions encountered in production processes may require the addition of threads, in particular high modulus threads such as for example glass yarns, in the longitudinal direction of the carrier material to withstand the high tensions in machine direction during processing, especially at elevated temperatures. Such carriers are well known, for example from EP1372951, and are generally produced by introducing a number of individual threads, preferably spaced apart at regular distances, in the nonwoven layer of fibers, either directly during the formation of the nonwoven layer of fibers or by laminating individual threads to a prefabricated nonwoven layer of fibers.

EP0239207 A2 discloses a method for manufacturing a papermaker's felt using a low melting scrim to which a batt is needled, followed by a heat treatment.

However, the introduction of large numbers of individual threads is a rather complex process, requiring a large creel to unwind the individual threads from bobbins. When the individual threads are introduced in the nonwoven layer of fibers directly during the formation of the nonwoven layer of fibers, the production efficiency is negatively influenced by interruptions both in the formation of the nonwoven layer of fibers and in the introduction of the individual threads.

Furthermore, to ensure that the individual threads extending in longitudinal direction remain spaced apart at regular distances, the tension on each individual thread has to be controlled to the same level thus posing high demands on process control during unwinding of the individual threads.

There thus remains a need for an improved process for providing a carrier material comprising a nonwoven layer of fibers and threads extending in longitudinal direction of the carrier material.

BRIEF SUMMARY

The object of the disclosure is to provide an improved method for manufacturing a carrier material comprising a nonwoven layer of fibers and threads extending in the longitudinal direction of the carrier material.

The object of the disclosure is achieved by a method for providing a two dimensional carrier material comprising a nonwoven layer of fibers and threads extending in the longitudinal direction of the carrier material comprising:
   supplying a nonwoven layer of fibers,
   supplying a scrim comprising warp threads and weft threads adjacent and co-planar to the nonwoven layer of fibers, and
   thermally bonding the scrim to the nonwoven layer of fibers
   wherein the scrim comprises weft threads comprising a polymer having a melting temperature which is equal to or less than the lowest melting temperature of the fibers comprised in the nonwoven layer of fibers and which is less than the melting temperature of at least a part of the warp threads comprised in the scrim.

Thermally bonding a scrim to a nonwoven layer of fibers, wherein the scrim comprises weft threads comprising a polymer having a melting temperature equal to or less than the lowest melting temperature of the fibers comprised in the nonwoven layer of fibers, enables an efficient way of securing the distance between the threads extending in the longitudinal direction of the carrier material.

DETAILED DESCRIPTION

As is well known to the person skilled in the art, a scrim is an open lattice structure composed of at least two sets of parallel threads, wherein the first group of parallel threads is oriented at an angle, generally at a 90° angle, to the second group of parallel threads. The first group of parallel threads may be connected to the second group of parallel threads by chemical bonding and/or the first group of parallel threads may be interwoven with the second group of parallel threads to form a woven scrim. Preferably, the openings in the scrim have at least one dimension in the plane of the carrier material being at least 1 mm, preferably at least 2 mm, more preferably at least 5 mm. More preferably, the openings in the scrim have two dimensions in the plane of the carrier material being at least 1 mm, preferably at least 2 mm, more preferably at least 5 mm.

A carrier material is understood to be an essentially two-dimensional structure having a thickness which is at least one order of magnitude smaller, preferably at least two orders of magnitude smaller, more preferably at least three orders of magnitude smaller than both the width and the length of the carrier material.

It is believed that although a carrier material comprising a nonwoven layer of fibers and a scrim composed of glass yarns both as warp and weft threads may solve some problems of the carrier material in processes subjecting the carrier material to high tensions and/or elevated temperatures, the presence of glass yarns as weft threads in the scrim may induce surface irregularities in the final product, such as for example a (cushioned) vinyl floor covering, a roofing underlayment sheet or a bitumen roofing membrane.

The glass yarn comprised as weft threads in the scrim may buckle, i.e. bending or kinking of the weft threads as a result of compressive stress, when the nonwoven layer of fibers shrinks or contracts in cross machine direction at elevated temperatures, in particular when exposed to high tension in machine direction.

In an embodiment, the weft threads of the scrim are configured such that after thermal bonding of the scrim to the nonwoven layer of fiber the individual weft threads are still present as a continuous phase but do not exhibit a stiffness which may cause surface defects, such as for example printing errors and/or surface irregularities during production of (cushioned) vinyl floor coverings or may cause surface irregularities during production of bitumen membranes or roofing underlayment sheets.

In an embodiment, the weft threads of the scrim are fully melted during thermal bonding of the scrim to the nonwoven layer of fibers such that the weft threads are no longer present as a continuous phase after thermal bonding. As there remain no weft threads in the scrim after thermal bonding to the nonwoven layer of fibers, formation of surface defects, such as for example printing errors and/or surface irregularities during production of the (cushioned)

vinyl floor coverings or formation of surface irregularities during production of bitumen membranes or roofing underlayment sheets, is prevented.

In an embodiment, the scrim is thermally bonded to a prefabricated nonwoven layer of fibers, i.e. which is consolidated by any suitable consolidation technique, such as for example by calendering the web of fibers between two calender rolls, by mechanical needling, by hydroentanglement, by ultrasonic bonding, by thermal bonding or by any combination thereof.

In an embodiment, the scrim is thermally bonded to a nonwoven layer of fibers directly after formation of a non-consolidated nonwoven layer of fibers to achieve simultaneously consolidation of the nonwoven layer of fibers and thermal bonding of the scrim to the nonwoven layer of fibers. In this embodiment there is no need for a separate consolidation step of the nonwoven layer of fibers thus achieving a more efficient production method.

The nonwoven layer of fibers may comprise thermoplastic polymeric fibers to provide sufficient tear strength and/or elongation to break to the carrier material.

In an embodiment, the weft threads of the scrim are predominantly made of a polymer having a melting temperature equal to or less than the lowest melting temperature of the fibers comprised in the nonwoven layer of fibers. Preferably, the weft threads of the scrim are made of a polymer having a melting temperature at least 10° C., preferably at least 20° C., more preferably at least 50° C. less than the lowest melting temperature of the polymers comprised in the thermoplastic fibers comprised in the nonwoven layer of fibers. The term predominantly made of is understood to mean that the weft threads are composed for at least 60 wt. %, preferably for at least 75 wt. %, more preferably at least 90 wt. %, more preferably at least 95 wt. %, even more preferably at least 99 wt. %, most preferably 100 wt. % of the total weight of the weft threads of the polymer having a melting temperature equal to or less than the lowest melting temperature of the fibers comprised in the nonwoven layer of fibers.

The melting temperature of a thermoplastic polymer is determined by Differential Scanning calorimetry (DSC) as the temperature at the maximum value of the endothermic melting peak upon heating of the polymer at a rate of 20° C./min.

In an embodiment, the threads extending in the longitudinal direction of the carrier material comprise high modulus yarns, such as for example polyester yarns, such as polyethylene terephthalate (PET) yarns, polyamide yarns, such as polyamide-6 (PA6) yarns, glass yarns, aramid yarns or carbon yarns and/or other high modulus yarns or any combination thereof, which are capable to withstand elevated temperatures and/or high tensions as for example encountered in manufacturing processes for bitumen roofing membranes, roofing underlayment sheets and (cushioned) vinyl floor coverings. The high modulus yarns may have a modulus of at least 1 GPa, preferably at least 5 GPa, preferably at least 10 GPa, preferably at least 15 GPa, preferably at least 20 GPa, preferably at least 25 GPa, preferably at least 40 GPa, more preferably at least 50 GPa, most preferably at least 75 GPa. Preferably, the high modulus threads extending in the longitudinal direction comprise glass yarns. Preferably all high modulus threads extending in the longitudinal direction comprised in the carrier are high modulus yarns, more preferably all high modulus threads are glass yarns.

The type and amount of high modulus yarns comprised as high modulus threads extending in the longitudinal direction of the carrier is selected such that the modulus of the carrier is at least 25 N/5 cm as determined as the load at specified elongation of 2% (LASE2%) in accordance with EN29073-3 (08-1992) with a clamp speed of 200 mm/min. Preferably, the modulus of the carrier is at least 50 N/5 cm, more preferably at least 100 N/5 cm, even more preferably at least 200 N/5 cm, most preferably at least 250 N/5 cm.

Within the scope of the present disclosure it is understood that the term fibers refers to both staple fibers and filaments. Staple fibers are fibers which have a specified, relatively short length in the range of 2 to 200 mm. Filaments are fibers having a length of more than 200 mm, preferably more than 500 mm, more preferably more than 1000 mm. Filaments may even be virtually endless, for example when formed by continuous extrusion and spinning of a filament through a spinning hole in a spinneret.

The fibers may have any cross sectional shape, including round, trilobal, multilobal or rectangular, the latter exhibiting a width and a height wherein the width may be considerably larger than the height, so that the fiber in this embodiment is a tape. Furthermore, said fibers may be mono-component, bicomponent or even multi-component fibers.

In an embodiment, the fibers in the nonwoven layer of fibers are fibers having a linear density in the range of 1 to 25 dtex, preferably in the range of 2 to 20 dtex, more preferably in the range of 5 to 15 dtex, most preferably in the range of 5 to 10 dtex to provide processing stability and mass regularity to the carrier while maintaining sufficient structure openness for impregnation of a high viscosity material such as for example bitumen or PVC plastisol through the carrier. The unit dtex defines the fineness of the fibers as their weight in grams per 10000 meter.

The nonwoven layer of fibers comprised in the carrier may be any type of nonwoven, such as for example staple fiber nonwovens produced by well-known processes, such as carding processes, well-laid processes or air-laid processes or any combination thereof. The nonwoven layer of fibers may also be a nonwoven composed of filaments produced by well-known spunbonding processes wherein filaments are extruded from a spinneret and subsequently laid down on a conveyor belt as a web of filaments and subsequently bonding the web to form a nonwoven layer of fibers, or by a two-step process wherein filaments are spun and wound on bobbins, preferably in the form of multifilament yarns, followed by the step of unwinding the multifilament yarns and laying the filaments down on a conveyor belt as a web of filaments and bonding the web to form a nonwoven layer of fibers.

Preferably, the fibers in the nonwoven layer of fibers are filaments in order to provide higher tensile strength and/or higher tear strength to the carrier and/or to the final impregnated product, such as for example a bitumen roofing membrane, a roofing underlayment sheet or a (cushioned) vinyl floor covering.

The nonwoven layer of fibers may be composed of thermoplastic fibers for at least 50 wt. % of the total weight of fibers in the nonwoven layer of fibers, preferably for at least 75 wt. %, more preferably for at least 90 wt. %, even preferably for at least 95 wt. %. Increasing the amount of thermoplastic fibers in the nonwoven layer of fibers increases the tensile strength and/or tear resistance and increases the flexibility of final impregnated product.

In an embodiment the nonwoven layer of fibers is composed for 100 wt. % of thermoplastic fibers of the total weight of fibers in the nonwoven layer of fibers.

The thermoplastic polymer from which the thermoplastic fibers in the nonwoven layer of fibers are composed may be any type of thermoplastic polymer capable of withstanding elevated temperatures such as for example encountered in manufacturing processes for bitumen roofing membranes, roofing underlayment sheets and (cushioned) vinyl floor coverings. The thermoplastic fibers in the nonwoven layer of fibers may comprise a polyester, such as for example polyethylene terephthalate (PET) (based either on DMT or PTA), polybutylene terephthalate (PBT), polytrimethylene terephthalate (PTT), polyethylene naphthalate (PEN) and/or polylactic acid (PLA), a polyamide, such as for example polyamide-6 (PA6), polyamide-6,6 (PA6,6) and/or polyamide-6,10 (PA6,10), polyphenylenesulfide (PPS), polyethyleneimide (PEI) and/or polyoxymethylene (POM) and/or any copolymer or any blend thereof.

The thermoplastic fibers may comprise up to 25 wt. %, based on the total weight of the fibers, of additives, such as for example spinning auxiliaries, fillers, flame retardant materials, UV inhibitors, crystallization retarders/accelerators, plasticizers, heat stabilizers, antimicrobial additives, coloring agents such as for example carbon black or any combination thereof.

The weight of the nonwoven layer of fibers comprised in the carrier may be in the range of 40 g/m² to 250 g/m², preferably in the range of 45 g/m² to 200 g/m², preferably in the range of 50 g/m² to 150 g/m², more preferably in the range of 50 g/m² to 120 g/m², most preferably in the range of 60 g/m² to 100 g/m², to keep the structure of the carrier open enough for impregnation with an impregnation material, such as for example bitumen or PVC plastisol and to provide sufficient mechanical adhesion of the impregnation material to the carrier material. Lower weight of the nonwoven layer of fibers results in less consumption of impregnation material such as bitumen or PVC plastisol, but a too low weight of the nonwoven layer of fibers could result PVC plastisol (or bitumen) falling through the carrier before the PVC has been gelated into a coherent PVC material.

In an embodiment the nonwoven layer of fibers, preferably composed of filaments, may be composed of a single type of mono-component fibers, which are bonded by any suitable bonding technique, such as for example by calendering the web of fibers between two calender rolls, by mechanical needling, by hydroentanglement, by ultrasonic bonding or by any combination thereof.

In another embodiment the nonwoven layer of fibers, preferably composed of filaments, may comprise two types of mono-component fibers, each type of mono-component fibers being composed of a polymer of different chemical construction having a different melting point. It is preferred that the melting points of the two different polymers differ by at least 10° C., preferably by at least 20° C. More preferably the melting points differ by at least 50° C. Such a product could be thermally bonded by subjecting the web of fibers to a temperature in the range of the melting point of the polymer with the lower melting point.

In yet another embodiment the nonwoven layer of fibers, preferably composed of filaments, may comprise bicomponent fibers. Bicomponent fibers are fibers composed of two polymers of different chemical construction. A basic distinction is being drawn between three types of bicomponent fibers: side-by-side types, core-sheath types and islands-in-the-sea types bicomponent fibers. In an embodiment the melting points of the two polymers building the bicomponent fibers differ by at least 10° C., preferably at least 20° C. More preferably the melting points differ by at least 50° C. Such a nonwoven layer comprising bicomponent fibers, when composed of side-by-side types and/or core-sheath type bicomponent fibers, could be thermally bonded by subjecting the web of fibers to a temperature in the range of the melting point of the polymer with the lower melting point. In a preferred embodiment the nonwoven carrier is predominantly made from core-sheath type bicomponent fibers, preferably filaments. Predominantly is understood to mean that at least 50% of the fibers comprised in the nonwoven layer of fibers are core-sheath type bicomponent fibers, preferably at least 75%, more preferably at least 90%, even more preferably at least 95%, most preferably 100%.

Preferably the core/sheath ratio in the core/sheath bicomponent fibers lies between 95/5 Vol. % and 5/95 Vol. %. More preferably the core/sheath ratio lies between 50/50 Vol. % and 95/5 Vol. %.

In an embodiment the sheath of the core/sheath bicomponent fibers consists mainly of a polyamide, preferably polyamide-6 (PA6), and the core consists mainly of a polyester, preferably polyethylene terephthalate (PET).

The carrier material may comprise one or more further layers, each layer selected from a nonwoven layer of fibers and/or a scrim, for example to improve the mass uniformity of the carrier and/or to further reduce the shrinkage and/or contraction in cross machine direction of the nonwoven layer of fibers comprised in the carrier.

The invention claimed is:

1. A method for providing a two dimensional carrier material for vinyl floor covering, roofing underlayment sheet or bitumen roofing membrane comprising a nonwoven layer of fibers and threads extending in the longitudinal direction of the carrier material, comprising:
   supplying a nonwoven layer of fibers,
   supplying a scrim comprising warp threads and weft threads adjacent and co-planar to the nonwoven layer of fibers, the warp threads extending in the longitudinal direction of the carrier material and comprising high modulus yarns having a modulus of at least 1 GPa, and
   thermally bonding the scrim to the nonwoven layer of fibers
   wherein the weft threads of the scrim are predominantly made of a polymer having a melting temperature which is equal to or less than the lowest melting temperature of the fibers comprised in the nonwoven layer of fibers and which is less than the melting temperature of at least a part of the warp threads of the scrim, the weft threads comprising the polymer in an amount of at least 95 percent by weight, and
   wherein the weft threads of the scrim are fully melted during thermal bonding of the scrim to the nonwoven layer of fibers such that the weft threads are no longer present as a continuous phase after thermal bonding.

2. The method according to claim 1, wherein the nonwoven layer of fibers is supplied as a prefabricated nonwoven layer of fibers.

3. The method according to claim 1, wherein the nonwoven layer of fibers comprises thermoplastic polymeric fibers.

4. The method according to claim 1, wherein the nonwoven layer of fibers comprises two types of mono-component fibers, each type of mono-component fibers being composed of a polymer of different chemical construction having a different melting point.

5. The method according to claim 4, wherein the melting points of the polymers of the two types of mono-component fibers differ by at least 10° C.

6. The method according to claim 4, wherein the melting points of the polymers of the two types of mono-component fibers differ by at least 20° C.

7. The method according to claim 4, wherein the melting points of the polymers of the two types of mono-component fibers differ by at least 50° C.

8. The method according to claim 1, wherein the nonwoven layer of fibers comprises bicomponent fibers composed of two polymers of different chemical construction having a different melting point.

9. The method according to claim 8, wherein the melting points of the polymers of the two components of the bicomponent fibers differ by at least 10° C.

10. The method according to claim 8, wherein the melting points of the polymers of the two components of the bicomponent fibers differ by at least 20° C.

11. The method according to claim 8, wherein the melting points of the polymers of the two components of the bicomponent fibers differ by at least 50° C.

12. The method according to claim 1, wherein the high modulus yarns have a modulus of at least 5 GPa.

13. The method according to claim 12, wherein the type and amount of high modulus yarns is selected such that the modulus of the carrier is at least 25 N/5 cm, as determined as the load at specified elongation of 2% (LASE2%) in accordance with EN29073-3 (08-1992) with a clamp speed of 200 mm/min.

14. The method according to claim 1, wherein the high modulus yarns are selected from the group consisting of polyester yarns, polyamide yarns, glass yarns, aramid yarns, or carbon yarns, and any combination thereof.

15. The method according to claim 1, wherein the high modulus threads extending in the longitudinal direction comprise glass yarns.

16. A method for providing a two dimensional carrier material for vinyl floor covering, roofing underlayment sheet or bitumen roofing membrane comprising a nonwoven layer of fibers and threads extending in the longitudinal direction of the carrier material, comprising:
    forming a nonwoven layer of fibers comprising a non-consolidated nonwoven layer of fibers, and, directly after formation of the nonwoven layer of fibers, thermally bonding a scrim comprising warp threads and weft threads adjacent and co-planar to the nonwoven layer of fibers, the warp threads extending in the longitudinal direction of the carrier material and comprising high modulus yarns having a modulus of at least 1 GPa, to achieve simultaneously consolidation of the nonwoven layer of fibers and thermal bonding of the scrim to the nonwoven layer of fibers,
    wherein the weft threads of the scrim are predominantly made of a polymer having a melting temperature which is equal to or less than the lowest melting temperature of the fibers comprised in the nonwoven layer of fibers and which is less than the melting temperature of at least a part of the warp threads of the scrim, the weft threads comprising the polymer in an amount of at least 95 percent by weight, and
    wherein the weft threads of the scrim are fully melted during thermal bonding of the scrim to the nonwoven layer of fibers such that the weft threads are no longer present as a continuous phase after thermal bonding.

* * * * *